US011894598B2

(12) United States Patent
Kaffash et al.

(10) Patent No.: US 11,894,598 B2
(45) Date of Patent: Feb. 6, 2024

(54) OPTICALLY TRANSPARENT TRIPLE BAND COPLANAR SLOT ANTENNA

(71) Applicant: GM GLOBAL TECHNOLOGY OPERATIONS LLC, Detroit, MI (US)

(72) Inventors: Sara Kaffash, Waterloo (CA); Farhad Sheikh Hosseini Lori, Markham (CA); William Hsiahua Wang, Troy, MI (US); Hongguang Sun, Vaughan (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 52 days.

(21) Appl. No.: 17/662,857

(22) Filed: May 11, 2022

(65) Prior Publication Data

US 2023/0369738 A1 Nov. 16, 2023

(51) Int. Cl.

*H01Q 1/12* (2006.01)
*H01Q 9/04* (2006.01)
*H01Q 13/10* (2006.01)
*H01Q 5/10* (2015.01)

(52) U.S. Cl.

CPC ............. *H01Q 1/1271* (2013.01); *H01Q 5/10* (2015.01); *H01Q 9/045* (2013.01); *H01Q 13/10* (2013.01)

(58) Field of Classification Search

CPC ........ H01Q 1/1271; H01Q 5/10; H01Q 9/045; H01Q 13/10

See application file for complete search history.

(56) References Cited

U.S. PATENT DOCUMENTS

2022/0278445 A1* 9/2022 Woo ........................ H01Q 21/08

OTHER PUBLICATIONS

Thongda "Textile Slot Bow-Tie Antenna for Wide Band Application" 2021 18th International Conference on Electrical Engineering/Electronics, Computer, Telecommunications and Information Technology (ECTI-CON), pp. 197-200 (Year: 2021).*

* cited by examiner

*Primary Examiner* — Dieu Hien T Duong
(74) *Attorney, Agent, or Firm* — Lorenz & Kopf, LLP

(57) ABSTRACT

An optically transparent coplanar microwave slot antenna is provided including a conductive mesh and a feedline connectively coupled to the conductive mesh wherein the conductive mesh includes a plurality of Christmas tree shaped slots arranged in a dipole configuration wherein each of the plurality of Christmas tree shaped slots is formed from a triangular slot, a trapezoidal slot and a rectangular slot.

20 Claims, 4 Drawing Sheets

100

200

300

400

OPTICALLY TRANSPARENT TRIPLE BAND COPLANAR SLOT ANTENNA

INTRODUCTION

The present disclosure generally relates to antennas, and more particularly relates to coplanar slot antennas configured to operate in three Wi-Fi frequency bands and to be optically transparent.

More and more advanced electronic systems are increasingly being integrated into modern vehicles. Examples may include infotainment systems, vehicle control systems, remote user interfaces, wireless communications systems and the like. Often these electronics systems require antennas to communicate with systems outside of the vehicle, such as cellular networks, Wi-Fi networks, near field combinations systems, Bluetooth communications, etc. Previously these antennas may be protruding from the vehicle outer surface, such as monopole antennas, diploe antennas, or groupings of antennas housed in an eternally mounted ‘shark fin’ protective housing.

Antennas have also been mounted to, or embedded within, vehicle window glass. Advantageously, this moves the antenna radiating elements away from reflective metal surfaces of the vehicle, but may cause visual obstructions to a driver or vehicle occupant. To address this problem, glass mounted vehicle antennas were often positioned at the outer edges of the vehicle windows to reduce the visible obstructions to the driver. However, moving the glass mounted antennas closer to the edge of the windows also brought the antennas closer to the metal structures of the vehicle and therefore affected the radiation pattern and efficacy of the antenna. Accordingly, it is desirable to address the aforementioned problems and to provide systems and methods for providing a glass mounted antenna. Furthermore, other desirable features and characteristics of the present disclosure will become apparent from the subsequent detailed description and the appended claims, taken in conjunction with the accompanying drawings and the foregoing technical field and background.

SUMMARY

Antenna structures are provided for transmitting and receiving a microwave electromagnetic signal. In one embodiment, an antenna includes a conductive mesh, a feedline connectively coupled to the conductive mesh, and wherein the conductive mesh includes a first Christmas tree shaped slot and a second Christmas tree shaped slot.

In accordance with another aspect of the present disclosure, wherein the first Christmas tree shaped slot is formed by a triangular slot, a trapezoidal slot and a rectangular slot.

In accordance with another aspect of the present disclosure, wherein the rectangular slot is 1 mm+/−15% by 25 mm+/−15%.

In accordance with another aspect of the present disclosure, wherein the triangular is an isosceles triangle having a leg length of 10.63 mm+/−15%.

In accordance with another aspect of the present disclosure, wherein the trapezoidal slot is an isosceles trapezoid having a leg length of 10.63 mm+/−15%.

In accordance with another aspect of the present disclosure, wherein the first Christmas tree shaped slot and the second Christmas tree shaped slot form a slot dipole antenna within the conductive mesh and wherein the first Christmas tree shaped slot is a first dipole part orthogonal to a first axis and the second Christmas tree shaped slot is a second dipole part orthogonal to the first axis.

In accordance with another aspect of the present disclosure, wherein an apex of a first triangular portion of the first Christmas tree shaped slot is closest to the first axis and a rectangular portion of the first Christmas tree shaped slot is furthest from the first axis.

In accordance with another aspect of the present disclosure, wherein the feedline includes a first conductor electrically coupled to a first portion of the conductive mesh and a second conductor electrically coupled to a second portion of the conductive mesh and wherein the first portion of the conductive mesh and the second portion of the conductive mesh are separated by the first Christmas tree shaped slot and the second Christmas tree shaped slot.

In accordance with another aspect of the present disclosure, wherein the conductive mesh is 90 mm+/−10% by 32 mm+/−10%.

In accordance with another aspect of the present disclosure, wherein the conductive mesh has a conductor width of 0.05 mm and a conductor pitch of 1.15 mm.

In accordance with another aspect of the present disclosure, a dipole slot antenna including a conductive mesh having an upper portion and a lower portion wherein the upper portion is separated from the lower portion by a first element of the dipole slot antenna and a second element of the dipole slot antenna, wherein the first element of the dipole slot antenna is formed from a triangular slot, a trapezoidal slot, and a rectangular slot and wherein the second element of the dipole slot antenna is a mirror image of the first element of the dipole slot antenna around a first axis, and a feedline for coupling a microwave signal to the conductive mesh.

In accordance with another aspect of the present disclosure, wherein a first conductor of the feedline is electrically coupled to the upper portion of the conductive mesh and a second conductor of the feedline is electrically coupled to the lower portion of the conductive mesh.

In accordance with another aspect of the present disclosure, wherein the conductive mesh has a conductor wherein the upper portion of the conductive mesh and the lower portion of the conductive mesh are electrically coupled at an outer edge of the dipole slot antenna.

In accordance with another aspect of the present disclosure, wherein the dipole slot antenna is configured to be receive and transmit microwave signals at 2.4 GHz and between 6 GHz and 7 GHz.

In accordance with another aspect of the present disclosure, wherein the triangular slot, the trapezoidal slot, and the rectangular slot form a Christmas tree shape.

In accordance with another aspect of the present disclosure, wherein the conductive mesh is optically transparent.

In accordance with another aspect of the present disclosure, wherein the conductive mesh has a optical transmittance greater than 90%.

In accordance with another aspect of the present disclosure, wherein the conductive mesh has a conductor width of 0.05 mm and a conductor pitch of 1.15 mm.

In accordance with another aspect of the present disclosure, a coplanar slot antenna including a rectangular conductive mesh, a first slot element and a second slot element formed in a dipole arrangement within the conductive mesh wherein the first slot element is formed by a first triangular slot, a first trapezoidal slot, and a first rectangular slot and the second slot element is formed by a second triangular slot, a second trapezoidal slot, and a second rectangular slot, and a feedline for coupling a microwave signal to the rectangular conductive mesh.

In accordance with another aspect of the present disclosure, a coplanar slot antenna configured to receive microwave signals at 2.4 GHz and between 6 GHz and 7 GHz.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
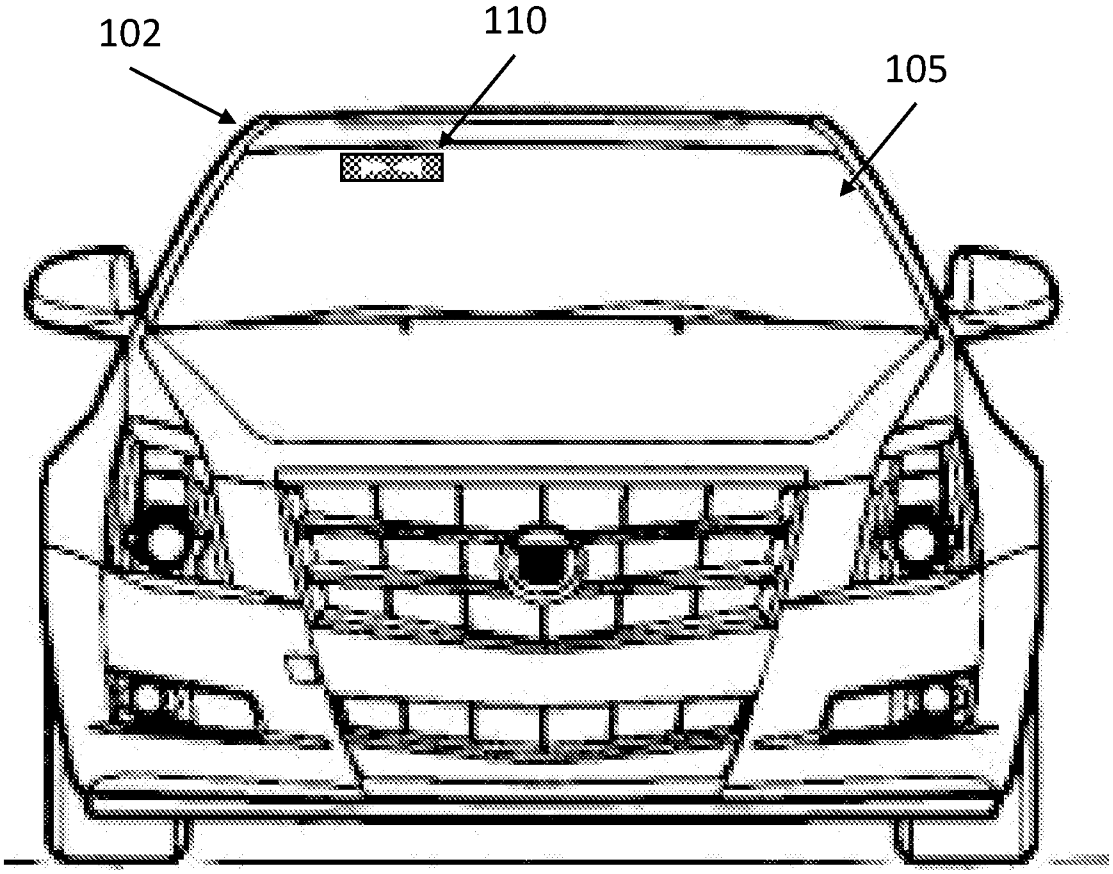
FIG. 1 is an exemplary environment 100 for use of the optically transparent triple band coplanar slot antenna 110 is shown in accordance with various embodiments.

Turning now to FIG. 1, an exemplary environment 100 for use of the optically transparent triple band coplanar slot antenna 110 associated with a vehicle 102 is shown in accordance with various embodiments.

The exemplary antenna 110 is configured to transmit and receive electromagnetic signals within specific frequency bands for communicating data between a network interface and a user device. For example, a user within the vehicle 102 may have a tablet computer used for displaying audio video programming. This audio video programming may be received from a streaming media service via an internet connection. The user may configure the tablet computer wireless network interface to connect to a wireless network provided within the vehicle 102. The antenna 110 is used to receive a wireless network signal from the tablet computer and couple the signal to the network interface or other processor within the vehicle 102. The network interface may be connected to a vehicle communications system, such as a cellular network interface, for receiving data, such as the audio video program, from an outside source via a cellular network. In some exemplary embodiments, the cellular network interface may be coupled to a separate antenna mounted to the vehicle 102 for receiving the cellular network signal.

The exemplary antenna 110 is configured in such a way to be optically transparent to a vehicle occupant. The exemplary antenna 110 therefore may be mounted toa vehicle windshield 105 without significantly obstructing an outside view from the vehicle occupant. Mounting the exemplary antenna 110 to a glass surface, such as the vehicle windshield 105, reduces the distortion of the radiation pattern of the exemplary antenna 110 caused by conductive surfaces of the vehicle 102 and allows the Wi-Fi signal to be received by a device outside of the vehicle 102 as well as inside the vehicle cabin.

The exemplary antenna includes overlapping triangular and rectangular slot portions in order to create two Christmas tree shaped slots which are configured in such a way to extend the bandwidth of the antenna 110 to cover three Wi-Fi frequency bands (2.4 GHz, 5 GHz, 6 GHz). This simple and efficient structure is designed to operate with a high gain over the mentioned bands without any nulls in the main lobe that meets all Wi-Fi standard requirements over the three frequency bands. Advantageously, the exemplary antenna 110 may be easily fabricated with a low-cost process and employed in new vehicles or retrofit in existing vehicles for use as a wide band Wi-Fi antenna. The antenna 110 may be constructed with the thin meshed copper technique to achieve desired optical transparency such that a transparency range of above 90% achieved. The antenna 110 is configured such that no integrated substrate is required for its operation and support.

Figure 2:
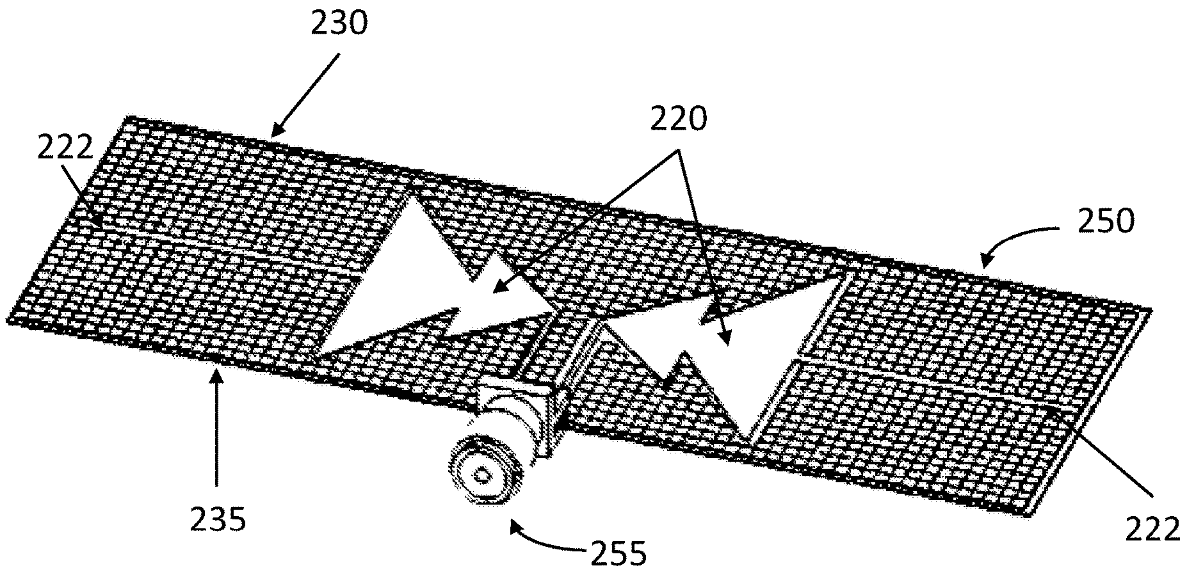
FIG. 2 is an exemplary optically transparent triple band coplanar slot antenna in accordance with various embodiments.

Turning now to FIG. 2, illustrates an exemplary optically transparent wide band coplanar slot antenna 200 that may be incorporated as the antenna 110 in the vehicle 102 of FIG. 1 in accordance with various embodiments. The exemplary optically transparent wide band slot antenna 200 is configured to operate in frequency bands covering the existing 2.4 GHz and 5 GHz bands and the newly allocated 6 GHz to 7 GHz Wi-Fi frequency bands with a realized gain of more than 3.5 dBi. The antenna 200 may have a minimum return loss of 10 dB and a null free radiation pattern over all the operating bands. The exemplary antenna 200 may include a substrate free structure without a matching network over all the operating bands. In general, the antenna 200 may be a coplanar slot antenna formed in a periodic patterned mesh conductor 250. The coplanar slot may be formed by two Christmas tree shaped slots 220, each having two overlapping triangular shaped slots and a single rectangular slot running from a base of the outermost triangular slot to a distal edge of the patterned mesh conductor 250. An outer portion of the patterned mesh conductor 250 forms an end of each of the rectangular slot 222 near the outer edge of the patterned mesh conductor 250. The antenna 200 may be coupled to an external transmission line by a coplanar waveguide with a first conductor coupled to the lower portion 235 and a second conductor coupled to the lower portion 235 of the patterned mesh conductor 250. The coplanar waveguide may be coupled to the external transmission line by an integrated electrical connector 255 such as a SubMiniature version A (SMA) connector.

The overlapping triangular slot portions of the Christmas tree slots 220 are configured such that an upper portion 230 of the patterned mesh conductor 250 is electrically isolated from a lower portion 235 of the patterned mesh conductor 250 except at the distal edge of the slots 222. A conductive portion of the patterned mesh conductor 250 is configured to electrically couple the upper portion 235 to the lower portion at the distal edge of the slot 222. In addition, the patterned mesh conductor 250 is configured to be optically transparent, such that the antenna 220 may be mounted to a glass window on a vehicle and not be visually obstructive to a vehicle operator. An optically transparent mesh may be achieved by having a conductor surface which is 15% or less of the total mesh surface. In some exemplary embodiments, the upper portion 230 of the patterned mesh conductor 250 and the lower portion 235 of the patterned mesh conductor 250 are formed from a single rectangular patterned mesh conductor where slots have been fabricated by removing portions of the single rectangular patterned mesh conductor. The upper portion 230 of the patterned mesh conductor 250 and the lower portion 235 of the patterned mesh conductor 250 are electrically coupled to each other at various points of the exemplary antenna such that the patterned mesh conductor 250 forms a common conductive element.

Figure 3:
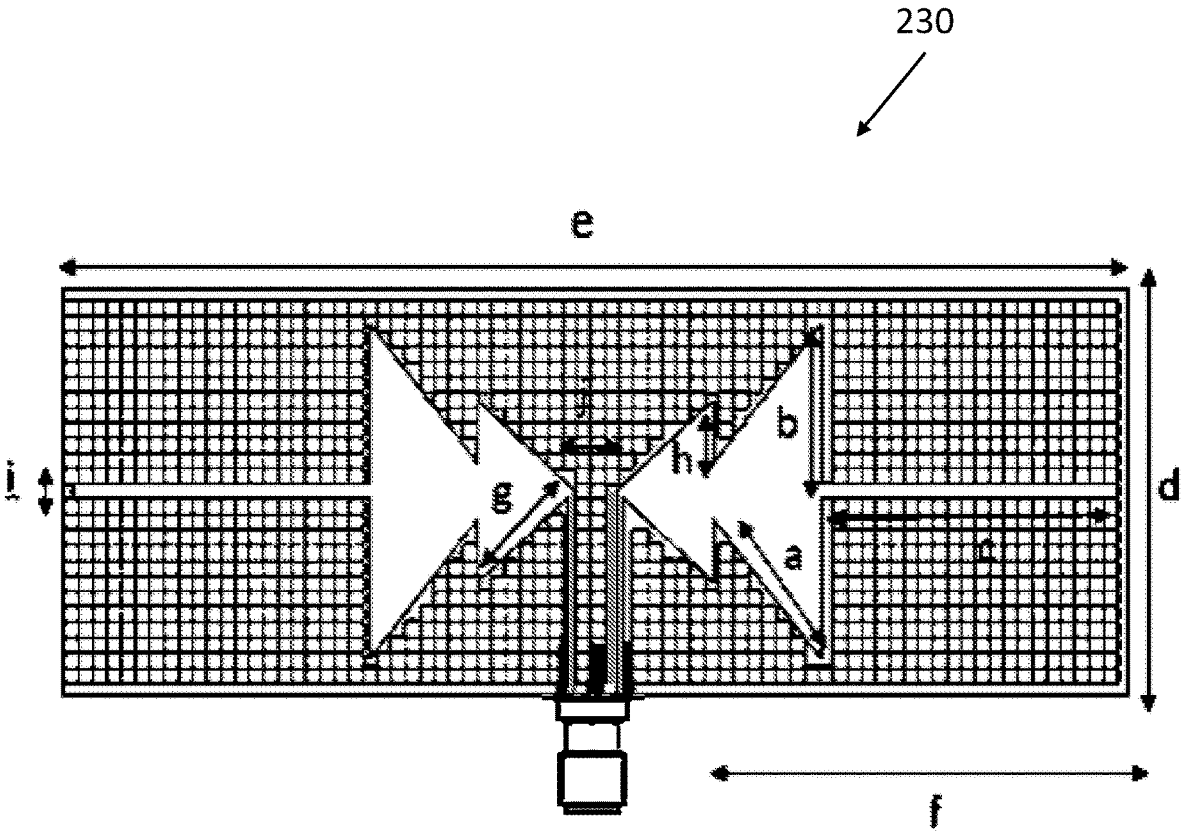
FIG. 3 is an exemplary embodiment of the optically transparent triple band coplanar slot antenna in accordance with various embodiments.

With reference now to FIG. 3, an exemplary embodiment of the optically transparent triple band coplanar slot antenna 300 is shown in accordance with various embodiments. The antenna 300 is coplanar such that all conductors are arranged in the same plane. In general, the smaller of the triangular slots on each of the Christmas tree slots provide the highest contribution to signal radiation in the 6 GHz to 7 GHz frequency band. The larger of the slots provides the highest contribution to signal radiation in the 5 GHz band. The slot provides the highest contribution to signal radiation int he 2.4 GHz band.

Figure 4:
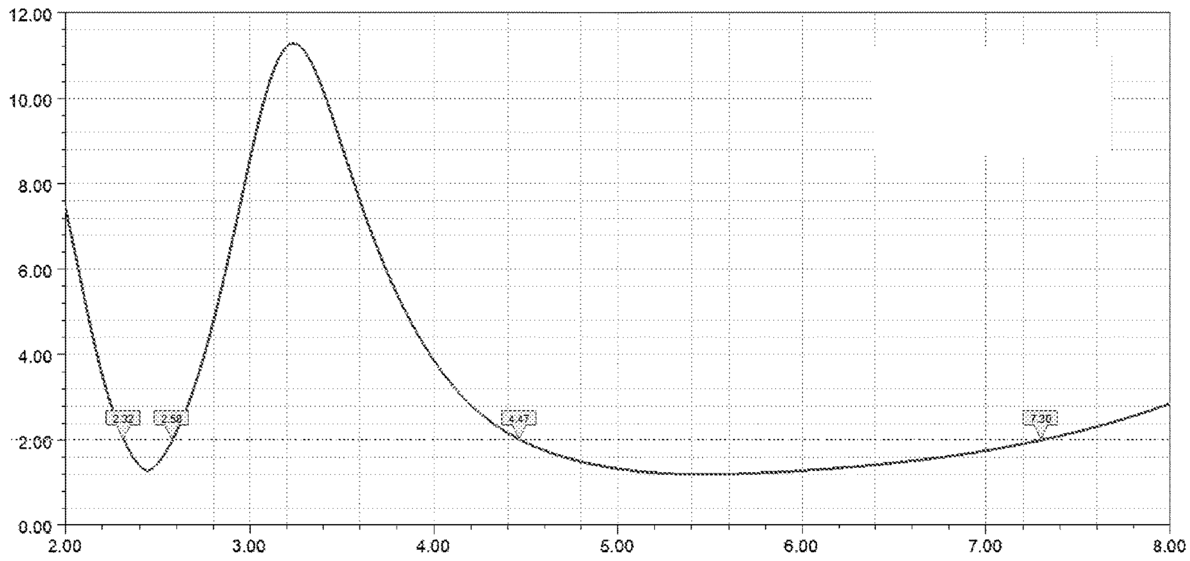
FIG. 4 is a graph displaying a voltage standing wave ratio for an exemplary coplanar slot antenna in accordance with various embodiments.

Table 1 is illustrative of the exemplary dimensions of the antenna 300 for optimal performance to cover the existing 2.4 GHz and 5 GHz bands and the newly allocated 6 GHz to 7 GHz Wi-Fi frequency band with a realized gain of more than 3.5 dBi. A graph 400 displaying the corresponding voltage standing wave ratio (VSWR) for an exemplary antenna with the dimensions as listed in Table 1 is shown in FIG. 4. Marginal variation of these dimensions of +/−15% observed without significant effects on the total antenna performance.

TABLE 1

| Antenna Dimensions | |
|---|---|
| a | 14.27 mm |
| b | 12.5 mm |
| c | 25 mm |
| d | 32 mm |
| e | 90 mm |
| f | 42.7 mm |
| g | 10.63 mm |
| h | 5 mm |
| i | 1 mm |
| j | 3.8 mm |

To achieve the desired optical transparency, the optical transmittance of the mesh should be greater than 85%. The exemplary mesh conductor has a conductor width of 0.05 mm and a pitch of 1.15 mm. This results in a fill factor (Ψ) of 0.041 and a mesh transparency ($T_{mesh}$) of 92% where $T_{mesh}=(1-\Psi)^2$. At the highest expected operating frequency of 7 GHZ, the signal wavelength is 42 mm which is much 36.5 time greater than the mesh pitch and therefore the mesh should perform as a solid surface at the highest expected operating frequency.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An antenna comprising:

a conductive mesh; and a feedline connectively coupled to the conductive mesh, wherein the conductive mesh includes a first Christmas tree shaped slot and a second Christmas tree shaped slot wherein the first Christmas tree shaped slot is formed by a triangular slot, a trapezoidal slot and a rectangular slot.

2. The antenna of claim 1 wherein the conductive mesh is a single rectangular conductive mesh and wherein the first Christmas tree shaped slot and the second Christmas tree shaped slot are fabricated by removing one or more portions of the single rectangular conductive mesh.

3. The antenna of claim 2 wherein the rectangular slot is 1 mm+/−15% by 25 mm+/−15%.

4. The antenna of claim 2 wherein the triangular is an isosceles triangle having a leg length of 10.63 mm+/−15%.

5. The antenna of claim 2 wherein the trapezoidal slot is an isosceles trapezoid having a leg length of 10.63 mm+/−15%.

6. The antenna of claim 1 wherein the first Christmas tree shaped slot and the second Christmas tree shaped slot form a slot dipole antenna within the conductive mesh and wherein the first Christmas tree shaped slot is a first dipole part orthogonal to a first axis and the second Christmas tree shaped slot is a second dipole part orthogonal to the first axis.

7. The antenna of claim 6 wherein an apex of a first triangular portion of the first Christmas tree shaped slot is closest to the first axis and a rectangular portion of the first Christmas tree shaped slot is furthest from the first axis.

8. The antenna of claim 1 wherein the feedline includes a first conductor electrically coupled to a first portion of the conductive mesh and a second conductor electrically coupled to a second portion of the conductive mesh and wherein the first portion of the conductive mesh and the second portion of the conductive mesh are separated by the first Christmas tree shaped slot and the second Christmas tree shaped slot.

9. The antenna of claim 1 wherein the conductive mesh is 90 mm+/−10% by 32 mm+/−10%.

10. The antenna of claim 1 wherein the conductive mesh has a conductor width of 0.05 mm and a conductor pitch of 1.15 mm.

11. A dipole slot antenna comprising:

a conductive mesh having an upper portion and a lower portion wherein the upper portion is separated from the lower portion by a first element of the dipole slot antenna and a second element of the dipole slot antenna, wherein the first element of the dipole slot antenna is formed from a triangular slot, a trapezoidal slot, and a rectangular slot and wherein the second element of the dipole slot antenna is a mirror image of the first element of the dipole slot antenna around a first axis; and a feedline for coupling a microwave signal to the conductive mesh.

12. The dipole slot antenna of claim 11 wherein a first conductor of the feedline is electrically coupled to the upper portion of the conductive mesh and a second conductor of the feedline is electrically coupled to the lower portion of the conductive mesh.

13. The dipole slot antenna of claim 12 wherein the conductive mesh has a conductor wherein the upper portion of the conductive mesh and the lower portion of the conductive mesh are electrically coupled at an outer edge of the dipole slot antenna.

14. The dipole slot antenna of claim 11 wherein the dipole slot antenna is configured to be receive and transmit microwave signals at 2.4 GHz and between 6 GHz and 7 GHz.

15. The dipole slot antenna of claim 11 wherein the triangular slot, the trapezoidal slot, and the rectangular slot form a Christmas tree shape.

16. The dipole slot antenna of claim 11 wherein the conductive mesh is optically transparent.

17. The dipole slot antenna of claim 11 wherein the conductive mesh has a optical transmittance greater than 90%.

18. The dipole slot antenna of claim 11 wherein the conductive mesh has a conductor width of 0.05 mm and a conductor pitch of 1.15 mm.

19. A coplanar slot antenna comprising:

a rectangular conductive mesh;

a first slot element and a second slot element formed in a dipole arrangement within the rectangular conductive mesh wherein the first slot element is formed by a first triangular slot, a first trapezoidal slot, and a first rectangular slot and the second slot element is formed by a second triangular slot, a second trapezoidal slot, and a second rectangular slot; and a feedline for coupling a microwave signal to the rectangular conductive mesh.

20. The coplanar slot antenna of claim 19 further configured to receive microwave signals at 2.4 GHz and between 6 GHz and 7 GHz.

* * * * *